(12) United States Patent
Ogura et al.

(10) Patent No.: US 9,881,020 B2
(45) Date of Patent: Jan. 30, 2018

(54) FILE DOCUMENT MANAGEMENT SERVER AND FILE DOCUMENT MANAGING METHOD

(71) Applicant: TOSHIBA TEC KABUSHIKI KAISHA, Tokyo (JP)

(72) Inventors: Kazuhiro Ogura, Hiratsuka Kanagawa (JP); Takao Ishida, Yokohama Kanagawa (JP); Ikuo Nishida, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 532 days.

(21) Appl. No.: 14/615,307

(22) Filed: Feb. 5, 2015

(65) Prior Publication Data

US 2015/0227551 A1 Aug. 13, 2015

(30) Foreign Application Priority Data

Feb. 13, 2014 (JP) .................................. 2014-25035

(51) Int. Cl.
*G06F 17/30* (2006.01)

(52) U.S. Cl.
CPC .. *G06F 17/30203* (2013.01); *G06F 17/30117* (2013.01); *G06F 17/30371* (2013.01)

(58) Field of Classification Search
CPC ......... G06F 17/30383; G06F 17/30085; G06F 17/30073; G06F 17/30221; G06F 17/30156; G06F 17/30117; G06F 17/30203; G06F 17/30371
See application file for complete search history.

(56) References Cited

U.S. PATENT DOCUMENTS

| | | | | |
|---|---|---|---|---|
| 6,584,466 B1* | 6/2003 | Serbinis | .............. | G06F 17/3089 707/754 |
| 8,010,805 B2* | 8/2011 | Gervais | .................... | G06F 21/10 380/201 |
| 8,160,082 B2* | 4/2012 | Harris | .................... | H04W 88/04 370/338 |
| 8,593,677 B2 | 11/2013 | Nishimi et al. | | |
| 9,275,205 B2* | 3/2016 | Kamei | .................... | G06F 21/34 |
| 9,405,478 B2* | 8/2016 | Koseki | ................. | G06F 3/0616 |
| 9,665,591 B2* | 5/2017 | Vijayan | ............. | G06F 17/30156 |
| 9,680,942 B2* | 6/2017 | Dimmick | ................ | H04L 67/18 |
| 9,763,151 B2* | 9/2017 | Kim | ....................... | H04W 36/04 |
| 2002/0116509 A1* | 8/2002 | DeLaHuerga | ........ | A61J 1/1437 709/229 |
| 2004/0117389 A1* | 6/2004 | Enami | .................... | G06F 3/1222 |
| 2006/0004868 A1* | 1/2006 | Claudatos | .......... | G06F 17/30085 |
| 2008/0098083 A1* | 4/2008 | Shergill | ............ | G06F 17/30303 709/217 |

(Continued)

*Primary Examiner* — Noosha Arjomandi
(74) *Attorney, Agent, or Firm* — Patterson & Sheridan, LLP

(57) ABSTRACT

According to an embodiment, a file document management server includes a controller and a memory. The memory stores expiration date information which indicates an expiration date of file documents which have been transmitted to a client device, and status information which indicates a storage state or a deletion state of the file documents of the client device to which the file documents have been transmitted. The controller changes the status information from a storage state to a deletion state when the expiration date passes.

10 Claims, 11 Drawing Sheets

(56) References Cited

U.S. PATENT DOCUMENTS

| | | | |
|---|---|---|---|
| 2008/0168087 A1* | 7/2008 | Repetti | G06F 9/4428 |
| 2009/0112882 A1* | 4/2009 | Maresh | G06F 19/321 |
| 2009/0144221 A1* | 6/2009 | Berk | G06F 17/30551 |
| 2012/0002239 A1 | 1/2012 | Okamura | |
| 2012/0066277 A1* | 3/2012 | Ubukata | G06F 17/30085 707/827 |
| 2013/0332477 A1* | 12/2013 | Nagai | G06F 17/30684 707/758 |
| 2014/0095449 A1* | 4/2014 | Marwah | G06F 17/30073 707/668 |

* cited by examiner

| CONFERENCE NAME 131a | FILE NAME 131b | TRANSMISSION DESTINATION DEVICE 131c | EXPIRATION DATE 131d | STATUS 131e |
|---|---|---|---|---|
|  |  |  |  |  |
| 20131201AM501 MEETING | TABLE OF CONTES | A12345670 | 20131231 | ABSENT |
| 20131201AM501 MEETING | MATERIAL 1 | A12345670 | 20131231 | ABSENT |
| 20131201AM501 MEETING | MATERIAL 2 | A12345670 | 20131231 | ABSENT |
| 20131201AM501 MEETING | MATERIAL 3 | A12345670 | 20131231 | ABSENT |
| 20131201AM501 MEETING | TABLE OF CONTES | A12345673 | 20131231 | ABSENT |
| 20131201AM501 MEETING | MATERIAL 1 | A12345673 | 20131231 | ABSENT |
| 20131201AM501 MEETING | MATERIAL 2 | A12345673 | 20131231 | ABSENT |
| 20131201AM501 MEETING | MATERIAL 3 | A12345673 | 20131231 | ABSENT |
| 20131201AM501 MEETING | TABLE OF CONTES | A12345677 | 20131231 | ABSENT |
| 20131201AM501 MEETING | MATERIAL 1 | A12345677 | 20131231 | ABSENT |
| 20131201AM501 MEETING | MATERIAL 2 | A12345677 | 20131231 | ABSENT |
| 20131201AM501 MEETING | MATERIAL 3 | A12345677 | 20131231 | ABSENT |

Fig.10

FILE DOCUMENT MANAGEMENT SERVER AND FILE DOCUMENT MANAGING METHOD

CROSS-REFERENCE TO RELATED APPLICATION

This application is based upon and claims the benefit of priority from the prior Japanese Patent Application No. 2014-25035, filed on Feb. 13, 2014, the entire contents of which are incorporated herein by reference.

FIELD

An embodiment described herein generally relates to a file document management server and a file document managing method.

BACKGROUND

Conventionally, there is a device which transmits file documents to a client PC (Personal Computer). This conventional device adds a password to file documents to be transmitted to protect security of the file documents. The client PC receives a password inputted by a user when opening the received file documents. The client PC can open the received file documents when the password added to the file documents and the received password match, and store the file documents. As described above, the conventional device adds a password to file documents from a point of view of protection of security of confidential information or the like included in file documents. The conventional device can secure security which works until file documents are opened. However, in case of the conventional device, file documents including confidential information are stored in a dispersed fashion at a client PC side for a long period of time, and therefore protection of security of file documents is still insufficient.

BRIEF DESCRIPTION OF THE DRAWINGS

FIG. 10 is a view illustrating transmission management information stored in the memory of the file document management server in a case where an expiration date of file document which has been transmitted by the file document management server according to the embodiment has passed.

DETAILED DESCRIPTION

According to one embodiment, a file document management server has an input interface, an output interface, a memory and a controller. The input interface receives a transmission request of file documents from a client device. The output interface transmits the file documents to the client device. The memory stores the file documents and transmission management information of the file documents. The transmission management information includes expiration date information which indicates an expiration date of the file documents which have been transmitted to the client device, and status information which indicates a storage state or a deletion state of the file documents in the client device to which the file documents have been transmitted. The controller specifies the file documents which are targets of the transmission request, from file documents of the memory when the input interface receives the transmission request, and transmits the expiration date information of the specified file documents and the specified file documents to the client device using the output interface. Further, the controller changes the status information of the transmitted file documents from the storage state to the deletion state when determining that the expiration date indicated by the expiration date information of the transmitted file documents has passed.

Figure 1:
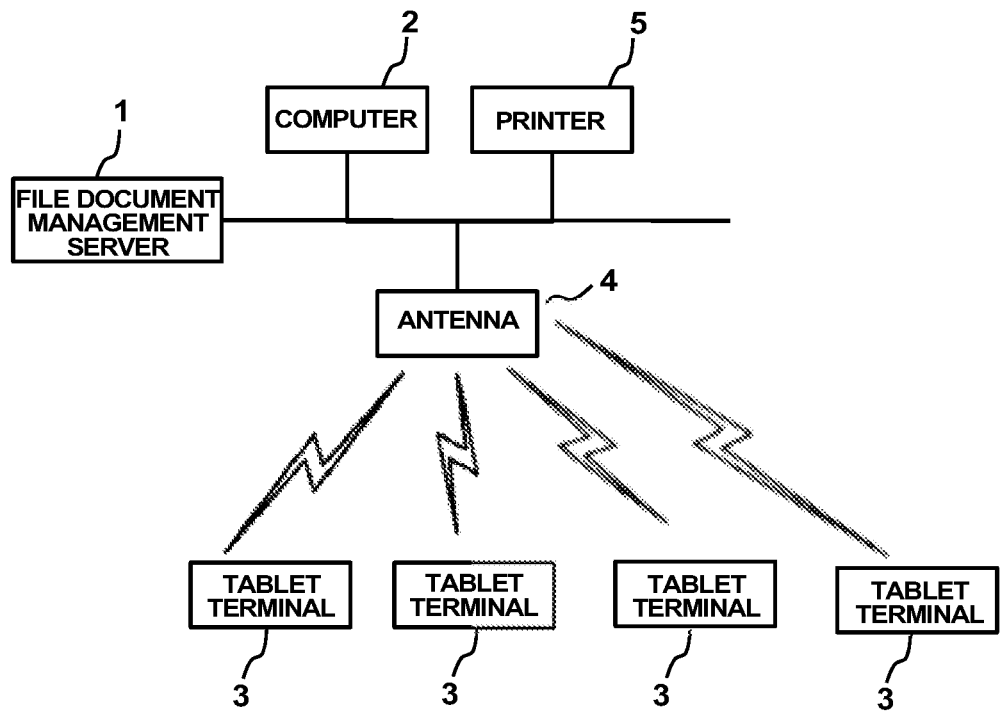
FIG. 1 is a schematic block diagram illustrating an electronic conference system including a file document management server according to an embodiment.

Hereinafter, an embodiment will be described with reference to the drawings. In the drawings, the same reference numerals indicate the same or similar portions. An electronic conference system including a file document management server according to the embodiment will be described with reference to FIG. 1. FIG. 1 is a schematic block diagram illustrating a configuration of the electronic conference system. As illustrated in FIG. 1, the electronic conference system has a file document management server 1, a computer 2 which is a file document creation source, a plurality of tablet terminals 3 which is a client device and an antenna 4. The computer 2 transmits file documents to the file document management server 1. A plurality of tablet terminals 3 receives file documents from the file document management server 1. The file document management server 1, the computer 2 and the antenna 4 are connected with each other through a network such as a LAN (Local Area Network). The antenna 4 is a device which transmits radio waves to the tablet terminals 3 to transmit information such as file documents from the file document management server 1 or the like to a plurality of tablet terminals 3. Further, the antenna 4 is a device which receives radio waves from a plurality of tablet terminals 3 or the like to receive information at the file document management server 1 or the like from a plurality of tablet terminals 3 or the like. The file document management server 1 is a server which constructs a database which functions as both of a file document storage database and a file document transmission management database. The file document management server 1 may be configured to include a server which constructs a file document storage database and a server which constructs a file document transmission management database.

Figure 2:
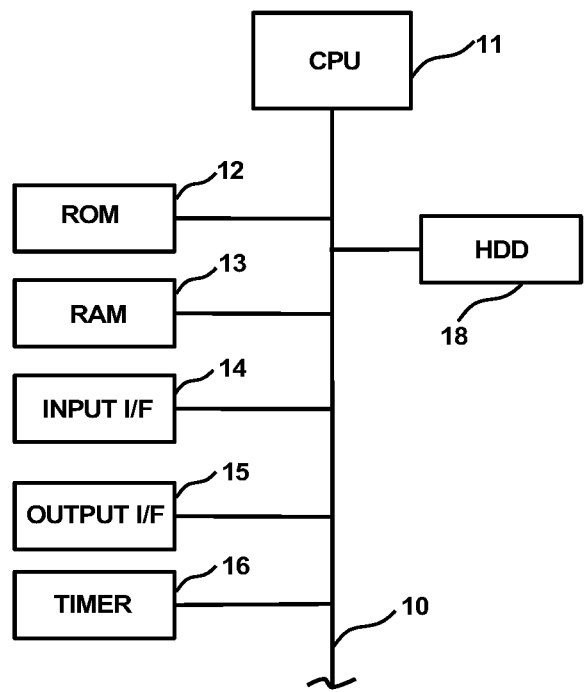
FIG. 2 is a block diagram illustrating the file document management server according to the embodiment.

The file document management server 1 will be described with reference to FIG. 2. FIG. 2 is a block diagram illustrating a configuration of the file document management server 1 according to the embodiment. As illustrated in FIG. 2, the file document management server 1 has a CPU (Central Processing Unit) 11 which is a controller, a ROM (Read-Only Memory) 12, a RAM (Random-Access Memory) 13, an input interface (input I/F) 14 and an output interface (output I/F) 15. The CPU 11 controls the entirety of the server. The ROM 12 stores programs and the like. The RAM 13 stores temporary data. The RAM 13 is further a memory (first memory) which stores transmission management information of file documents described later (see, for example, FIG. 5). The input I/F 14 receives an input of file documents and information from an outside. The output I/F 15 outputs file documents and information to the outside. Further, the file document management server 1 has a timer 16 and a hard disk drive (HDD) 18. The timer 16 indicates a current date and time. The HDD 18 stores file documents received from the outside. The HDD 18 is further a memory (second memory) which stores storage management information of file documents described later (see FIG. 4). The CPU 11, the ROM 12, the RAM 13, the input I/F 14, the output I/F 15, the timer 16 and the HDD 18 are connected with each other through a bus 10.

Figure 3:
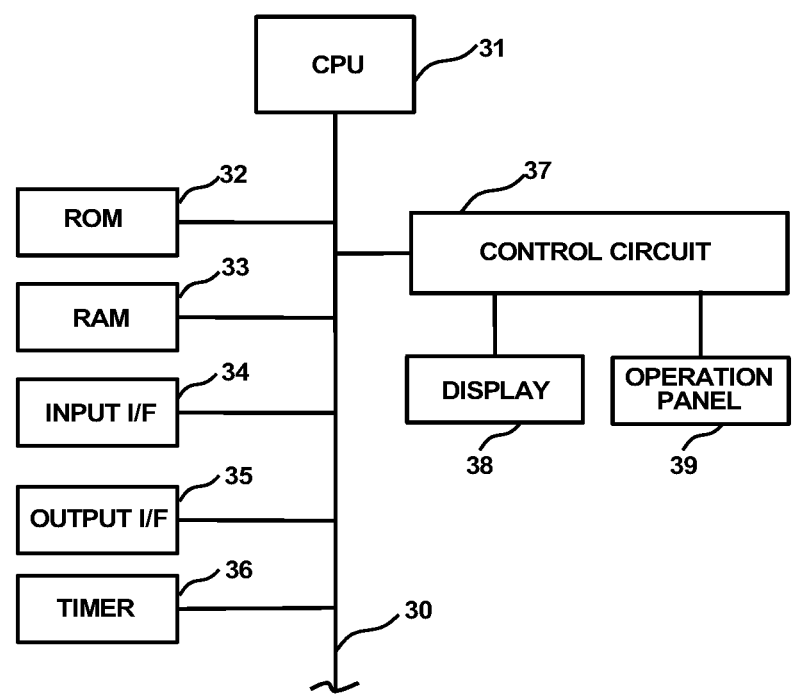
FIG. 3 is a block diagram illustrating a tablet terminal which is a client device of the electronic conference system including the file document management server according to the embodiment.

A configuration of the tablet terminal 3 will be described. FIG. 3 is a block diagram illustrating the tablet terminal 3. As illustrated in FIG. 3, the tablet terminal 3 has a CPU 31 which is a controller, a ROM 32, a RAM 33, an input interface (input I/F) 34 and an output interface (output I/F) 35. The CPU 31 controls the entirety of the tablet. The ROM 32 stores programs and the like. The RAM 33 stores temporary data. The RAM 33 further stores file documents received from the file document management server 1. The input I/F 34 receives file documents and information from the outside such as the file document management server 1. The output I/F 35 transmits file documents and information to the outside such as the file document management server 1. Further, the tablet terminal 3 has a timer 36, a control circuit 37, an display 38 and an operation panel 39. The timer 36 times a current date and time. The display 38 displays various pieces of information. The operation panel 39 receives user's instruction, selection and the like. The control circuit 37 controls the display 38 and the operation panel 39. The CPU 31, the ROM 32, the RAM 33, the input I/F 34 and the output I/F 35 are connected with each other through a bus 30. The file document management server 1 and the tablet terminal 3 may include an external I/F which is commonly applied as an input I/F and an output I/F.

Figure 4:
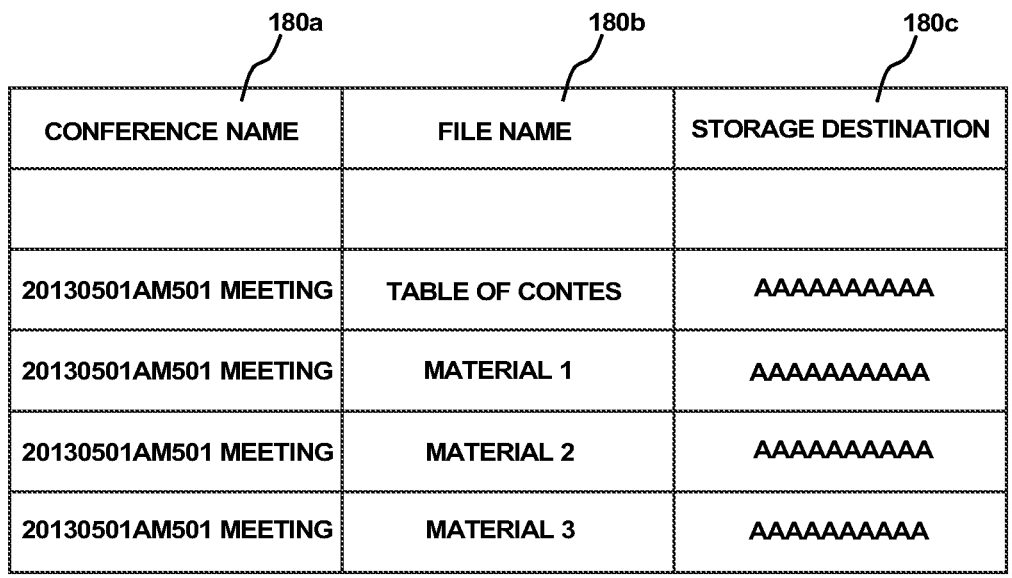
FIG. 4 is a view illustrating storage management information of file documents stored in a memory of the file document management server according to the embodiment.

Management of file documents stored in the file document management server 1 will be described with reference to FIG. 4. The file document management server 1 receives file documents transmitted from the computer 2 using the input I/F 14. When receiving the file documents, the file document management server 1 stores electronic data of the received file documents and storage management information of the file documents in the HDD 18. FIG. 4 is a view illustrating storage management information stored in the HDD 18. As illustrated in FIG. 4, the HDD 18 allocates the storage management information to a predetermined area to store. The storage management information is information for managing file documents stored in the file document management server 1. The storage management information includes file document information and storage destination information. The file document information is information for specifying file documents. The file document information includes conference name information and file name information. The conference name information is a name of a conference for which file documents are used. The file name information is a name assigned to a file document. The storage destination information is an address of a storage area in the HDD 18 in which electronic data of a file document is stored. In FIG. 4, the conference name information is indicated in a column 180*a*. In FIG. 4, the file name information is indicated in a column 180*b*. In FIG. 4, storage destination information is indicated in a column 180*c*. In FIG. 4, the HDD 18 stores file documents used for a conference with a conference name "20130501AM501 meeting". File names of four file documents are "table of contents", "material 1", "material 2" and "material 3". Electronic data of the four file documents is stored in a storage area with a storage destination address "AAAAAAAAAA" in the HDD 18. In addition, the conference name is indicated in a format of a date (May 1, 2013), a time (AM) and a conference room name (meeting room 501). However, a meeting room name may adopt an arbitrary format as long as the meeting room can be uniquely specified.

Figure 5:
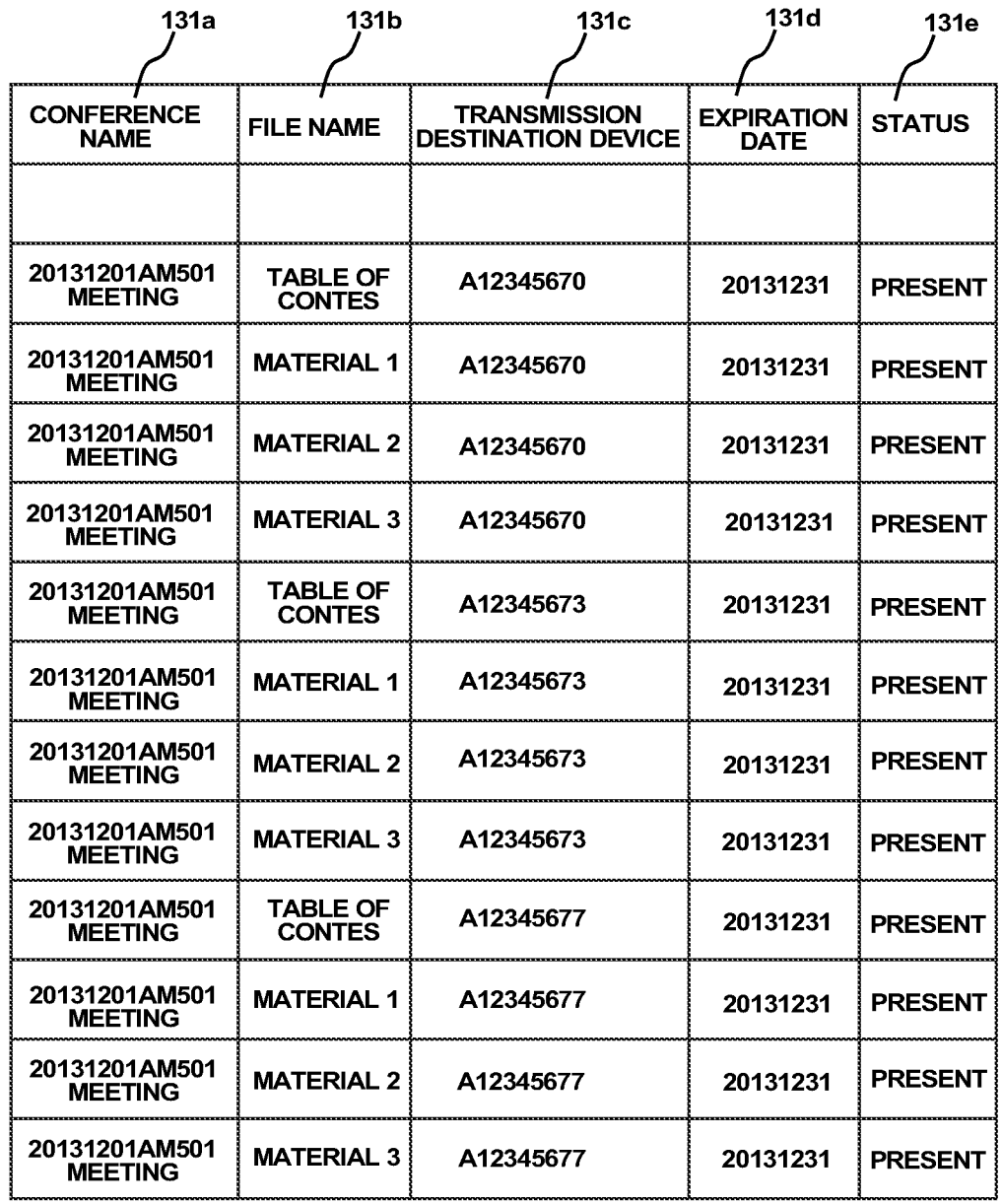
FIG. 5 is a view illustrating transmission management information of file documents stored in the memory of the file document management server according to the embodiment.

Management of file documents which need to be transmitted to the tablet terminals 3 (including file documents which have been transmitted to the tablet terminals 3) by the file document management server 1 will be described with reference to FIG. 5. The file document management server 1 transmits file documents to the tablet terminal 3 in response to a transmission request of file documents, which will be described later, from the tablet terminal 3. The file document management server 1 stores transmission management information of the file documents which need to be transmitted, in the RAM 13 when transmitting the file documents to the tablet terminal 3. FIG. 5 is a view illustrating transmission management information stored in the RAM 13. As illustrated in FIG. 5, the RAM 13 allocates the transmission management information to a predetermined area to store. Hence, the file document management server 1 has the HDD 18 as a memory which stores the storage management information of the file documents which has been received from the computer 2, and further has in addition to the HDD 18 the RAM 13 as a memory which stores transmission management information of the file documents which have been transmitted to the tablet terminals 3. However, the file document management server 1 may have a memory which is commonly applied as a memory which stores the storage management information, and a memory which stores the transmission management information. The transmission management information is information for managing file documents transmitted by the file document management server 1. The transmission management information includes file document information and transmission destination device information. The file document information is information for specifying transmitted file documents. The file document information includes conference name information and file name information. The conference name information is a name of a conference in which file documents are used. The file name information is a name assigned to a file document. The transmission destination device information is information for specifying a client device (tablet terminal 3) which is a file document transmission destination. More specifically, the transmission destination device information is identification information such as an IP address of the tablet terminal 3 or a management number of the tablet terminal 3. In FIG. 5, the RAM 13 stores transmission management information indicating that four file documents ("table of contents", "material 1", "material 2" and "material 3") used for a conference with a conference name "20131201AM501 meeting" have been transmitted to the three tablet terminals 3 (a tablet terminal "A12345670", a tablet terminal "A12345673" and a tablet terminal "A12345677").

In FIG. 5, the conference name information is indicated in a column 131*a*. In FIG. 5, the file name information is indicated in a column 131*b*. In FIG. 5, the transmission destination device information is indicated in a column 131*c*. The transmission destination device information is information such as a tablet management number which allows the transmission destination tablet terminal 3 to be uniquely specified as described above. In FIG. 5, the RAM 13 stores management numbers "A12345670", "A12345673" and "A12345677" indicating the three tablet terminals as transmission destination device information. The transmission management information further includes expiration date information and status information. The expiration date information is information which indicates an expiration date of file documents. More specifically, the expiration date information is an expiration date by when a user can browse file documents using the tablet terminal 3 to which the file documents are transmitted. In FIG. 5, the expiration date information is indicated in a column 131*d*. In FIG. 5, for example, an expiration date "20131231" of the expiration date information indicates that file documents can be browsed by Dec. 31, 2013. As illustrated in FIG. 5, the expiration date information may be a calendar date or may be the number of days from a transmission date of file documents. The status information is information which indicates a storage state or a deletion state of a file document in the transmission destination tablet terminal 3. More specifically, the RAM 13 stores as the status information a "present" flag indicating a storage state when the file document is stored in the tablet terminal 3, and stores an "absent" flag indicating a deletion state when the file document is not stored in the tablet terminal 3. In FIG. 5, the status information is indicated in a column 131*e*. The status information principally indicates "present" in a case where the expiration date has passed, and indicates "absent" in a case where the expiration date has not passed.

Figure 6:
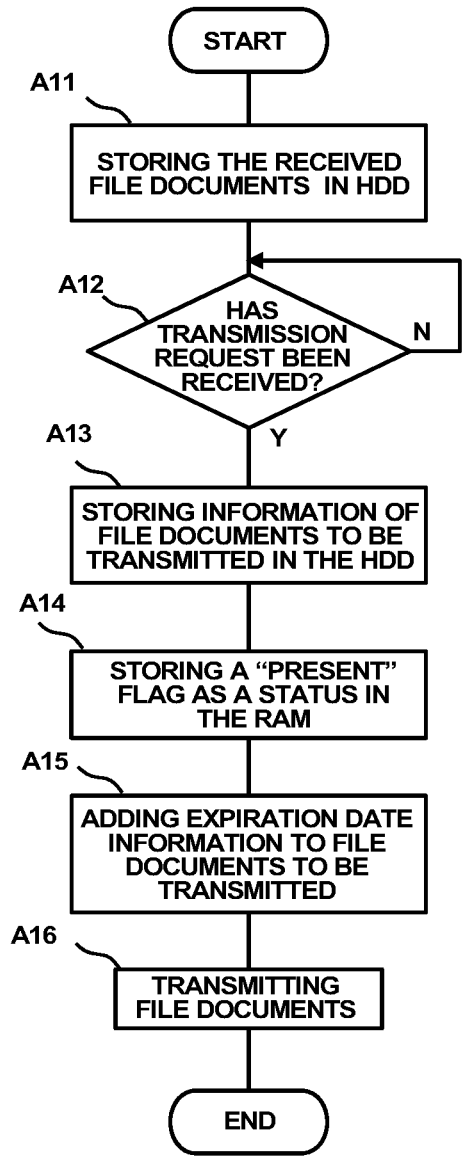
FIG. 6 is a flowchart illustrating first processing of the file document management server according to the embodiment.

First processing performed by the CPU 11 of the file document management server 1 to manage file documents stored in the HDD 18 will be described with reference to FIG. 6. FIG. 6 is a flowchart illustrating the first processing performed by the file document management server 1 to manage file documents. When the file document management server 1 receives file documents used for a conference from the computer 2, the CPU 11 starts processing illustrated in FIG. 6. As illustrated in FIG. 6, in A11, the CPU 11 stores the received file documents in a predetermined storage area of the HDD 18 when receiving the file documents from the computer 2 using the input I/F 14. The input I/F 14 receives the file documents, and conference name information and file name information of the file documents. Hence, the CPU 11 stores the file documents, and conference name information and file name information of the file documents as the storage management information in the HDD 18. Further, the CPU 11 stores storage destination information of file documents as the storage management information in the HDD 18 (see, for example, FIG. 4). In A11, when the file documents are stored in the HDD 18, processing of the file document management server 1 moves to A12 in FIG. 6. In A12, the CPU 11 determines a reception status in the input I/F 14 as to whether or not a transmission request of file documents has been received from the tablet terminal 3. The transmission request of the file documents transmitted from the tablet terminal 3 includes the file document information (e.g. conference name information) of transmission request target file documents. When the CPU 11 determines that the transmission request of the file documents has been received (Y in A12), the processing of the file document management server 1 moves to A13 in FIG. 6. Meanwhile, when the CPU 11 determines that the transmission request of the file documents has not been received (N in A12), the CPU 11 determines the reception status per, for example, predetermined time. In A13, the CPU 11 specifies file documents which need to be transmitted to the tablet terminal 3, from file documents stored in the HDD 18, based on conference name information included in the transmission request of the file documents. The CPU 11 stores in the RAM 13 the conference name information, the file name information, the transmission destination device information and the expiration date information as the transmission management information of the specified file documents (the file documents which need to be transmitted). The CPU 11 stores the transmission management information in the RAM 13 per specified file document. More specifically, in a case of the present embodiment illustrated in FIG. 4, the CPU 11 specifies four file documents based on one conference name. The CPU 11 stores in the RAM 13 file names assigned to the four specified file documents as file names of the file documents which need to be transmitted. For example, as illustrated in FIG. 5, the CPU 11 stores "table of contents", "material 1", "material 2" and "material 3" as file names in the RAM 13. The CPU 11 stores a conference name included in the transmission request of the file documents as a conference name of the file documents which need to be transmitted, in the RAM 13 per four file documents. For example, as illustrated in FIG. 5, the CPU 11 stores information of "20131201AM501 meeting" as a conference name in the RAM 13. The CPU 11 stores information of the tablet terminal 3 which is a transmission destination device of file documents which need to be transmitted, and which has transmitted the transmission request of the file documents, in the RAM 13 per four file documents. For example, as illustrated in FIG. 5, the CPU 11 stores management numbers "A12345670", "A12345673" and "A12345677" as transmission destination device information in the RAM 13. The CPU 11 stores a date after a predetermined number of days based on a day on which the transmission request of the file documents has been transmitted from the tablet terminal 3, as an expiration date of the file documents which need to be transmitted in the RAM 13. When, for example, a transmission date of a transmission request of file documents of a conference (conference name "20131201AM501 meeting") on Dec. 1, 2013 is Nov. 30, 2013, the CPU 11 stores information "20131231" indicating the last day of the next month (Dec. 31, 2013) of the transmitting month (November) in the RAM 13 as illustrated in FIG. 5. In A13, when the CPU 11 stores the transmission management information in the RAM 13, the processing of the file document management server 1 moves to A14 in FIG. 6. In A14, the CPU 11 stores status information of the specified file documents (file documents which need to be transmitted) in the RAM 13. More specifically, as illustrated in FIG. 5, the CPU 11 stores the "present" flag as a status in the RAM 13. When the CPU 11 stores the status in the RAM 13, the processing of the file document management server 1 moves to A15 in FIG. 6. In A15, the CPU 11 reads the specified file documents from the HDD 18, and adds the expiration date to the file documents. When the CPU 11 adds expiration date information to the specified file documents, the processing of the file document management server 1 moves to A16 in FIG. 6. In A16, the CPU 11 collects a plurality of specified file documents in one folder. The CPU 11 transmits this folder (a plurality of specified file documents) and the added expiration date information to the tablet terminal 3 using the output I/F 15. The transmission destination tablet terminal 3 is a tablet which has transmitted the transmission request of the file documents. As described above, the processing in A13 is processing performed by the CPU 11 to specify file documents which need to be transmitted. The processing in A13 is processing performed by the CPU 11 to store conference name information, file name information, transmission destination device information and expiration date information as the transmission management information of the specified file documents. The processing in A14 is processing performed by the CPU 11 to store status information as the transmission management information of the specified file documents. The processing in A15 is processing performed by the CPU 11 to add expiration date information to the specified file documents (the file documents which need to be transmitted). The processing in A16 is processing performed by the CPU 11 to transmit the specified file documents using the output I/F 15.

Figure 7:
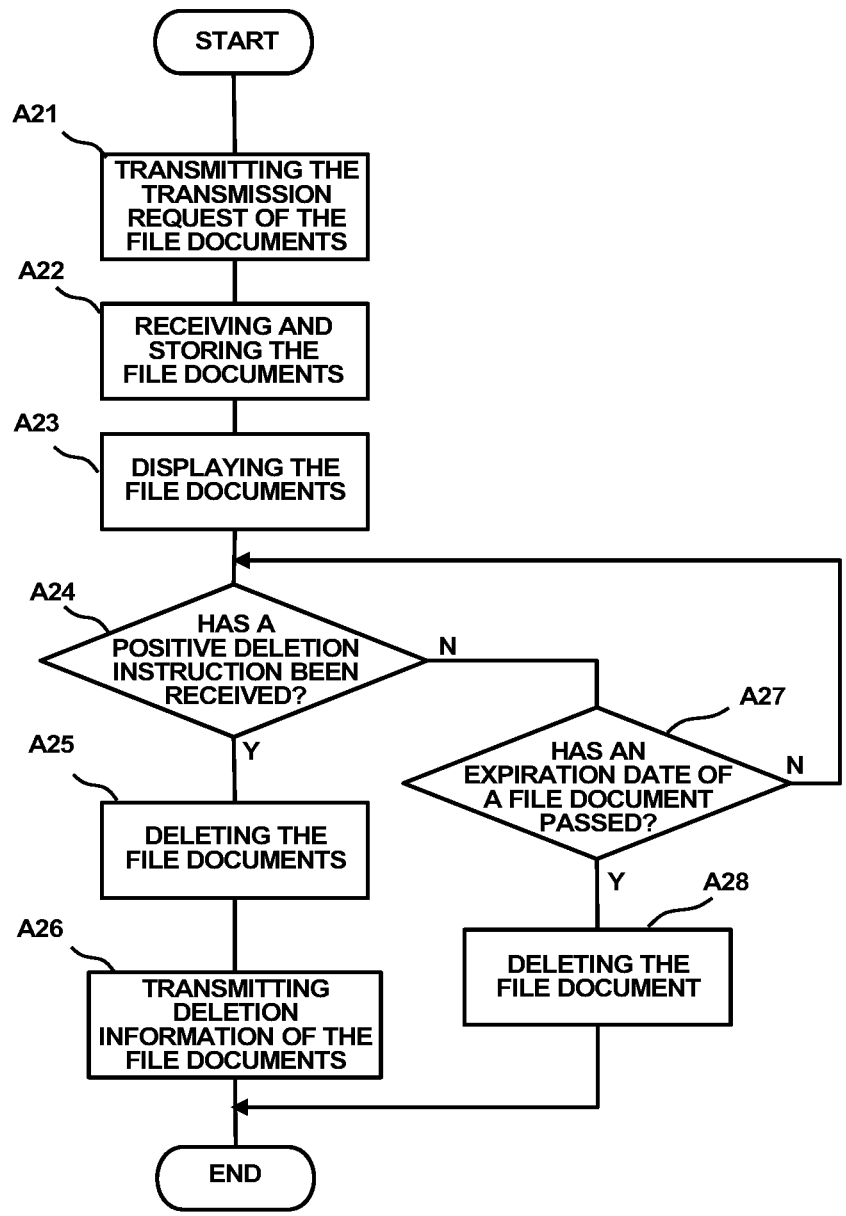
FIG. 7 is a flowchart illustrating processing of the tablet terminal which is the client device of the electronic conference system including the file document management server according to the embodiment.

The processing of the CPU 31 of the tablet terminal 3 will be described with reference to FIG. 7. FIG. 7 is a flowchart illustrating the processing of the tablet terminal 3. When the tablet terminal 3 receives a user's instruction of the transmission request of file documents, the tablet terminal 3 starts the processing illustrated in FIG. 7. As illustrated in FIG. 7, in A21, the CPU 31 transmits the transmission request of the file documents used for a conference specified by the user, to the file document management server 1 using the output I/F 35. The transmission request of the file documents includes a name of a conference specified by the user (conference name information). The CPU 31 receives necessary information such as a conference name specified by the user using a button or the like of the operation panel 39. When the CPU 31 transmits the transmission request of the file documents to the file document management server 1, the processing of the tablet terminal 3 moves to A22 in FIG. 7. In A22, the CPU 31 receives using the input I/F 34 the file documents transmitted from the file document management server 1 in response to the transmission request of the file documents. The expiration date information is added to the file documents (see A15 in FIG. 6). The CPU 31 stores the received file documents in a predetermined area of the RAM 33. The CPU 31 associates the expiration date information and the file documents to store in the predetermined area of the RAM 33. When the CPU 31 stores the file documents in the RAM 33, the processing of the tablet terminal 3 moves to A23 in FIG. 7. In A23, the CPU 31 receives a user's instruction to open the file document using the operation panel 39. The CPU 31 opens a file document which is an open instruction target from the file documents stored in the RAM 33 according to the user's instruction to open the file document. The CPU 31 displays the opened file document on the display 38. As described above, the processing in A22 is processing performed by the CPU 31 to receive the file documents using the input I/F 34. The processing in A23 is processing performed by the CPU 31 to display the file document using the display 38.

When the CPU 31 causes the display 38 to display the opened file document, the processing of the tablet terminal 3 moves to A24 in FIG. 7. In A24, the CPU 31 determines whether or not the operation panel 39 has received a user's instruction to positively delete a file document (a file document stored in the tablet terminal 3). When the CPU 31 determines that the operation panel 39 has received the instruction to positively delete the file document (Y in A24), the processing of the tablet terminal 3 moves to A25 in FIG. 7. In A25, the CPU 31 deletes the file document which is a deletion instruction target from the predetermined area of the RAM 33. For example, the CPU 31 may delete all file documents to which the same conference name is assigned as file documents which are deletion instruction targets. Alternatively, the CPU 31 may delete a file document which is a deletion instruction target in units of individual file documents. When the CPU 31 deletes the file document from the RAM 33, the processing of the tablet terminal 3 moves to A26 in FIG. 7. In A26, the CPU 31 transmits information indicating that the file document instructed by the user has been deleted, to the file document management server 1 using the output I/F 35.

Meanwhile, when the CPU 31 determines that the operation panel 39 has not received a positive deletion instruction of a file document (N in A24), the processing of the tablet terminal 3 moves to A27 in FIG. 7. In A27, the CPU 31 compares for the file document stored in the RAM 33 an expiration date of the expiration date information assigned to the file document transmitted from the file document management server 1, and a current time (a date and a time) of the timer 36. The CPU 31 determines whether or not the expiration date of the file document stored in the RAM 33 has passed, based on this comparison result. In other words, the CPU 31 determines whether or not there is a file document whose expiration date has passed among the file documents stored in the RAM 33, based on the comparison result. When the CPU 31 determines that there is a file document whose expiration date has passed (Y in A27), the processing of the tablet terminal 3 moves to A28 in FIG. 7. In A28, the CPU 31 deletes the file document whose expiration date has passed, from the predetermined area of the RAM 33. Meanwhile, when the CPU 31 determines that there is no file document whose expiration date has passed (N in A27), the processing of the tablet terminal 3 returns to A24. In A28, the CPU 31 may transmit information indicating that the file document has been deleted, to the file document management server 1 using the output I/F 35. Further, in A28, for example, the CPU 31 may delete a file document upon turning on a tablet. Alternatively, the CPU 31 may delete a file document at a predetermined time (e.g. 0 o'clock at midnight) based on the timer 16. As described above, the processing in A25 and A28 is processing performed by the CPU 31 to delete the file document. The processing in A27 is processing performed by the CPU 31 to determine whether or not the expiration date has passed.

In A27, the CPU 31 may execute the determination processing at a predetermined timing instead of at all times. Further, the CPU 31 may perform the positive deletion processing based on a user's instruction (A25) and deletion processing due to elapse of an expiration date (A28) in different processing flows without performing the processing in one processing flow as illustrated in FIG. 7. Furthermore, the CPU 31 may perform processing up to processing of displaying a file document (A23), and processing subsequent to the processing of displaying the file document in different processing flows.

Second processing performed by the file document management server 1 to manage transmitted file documents will be described with reference to FIG. 8.

Figure 8:
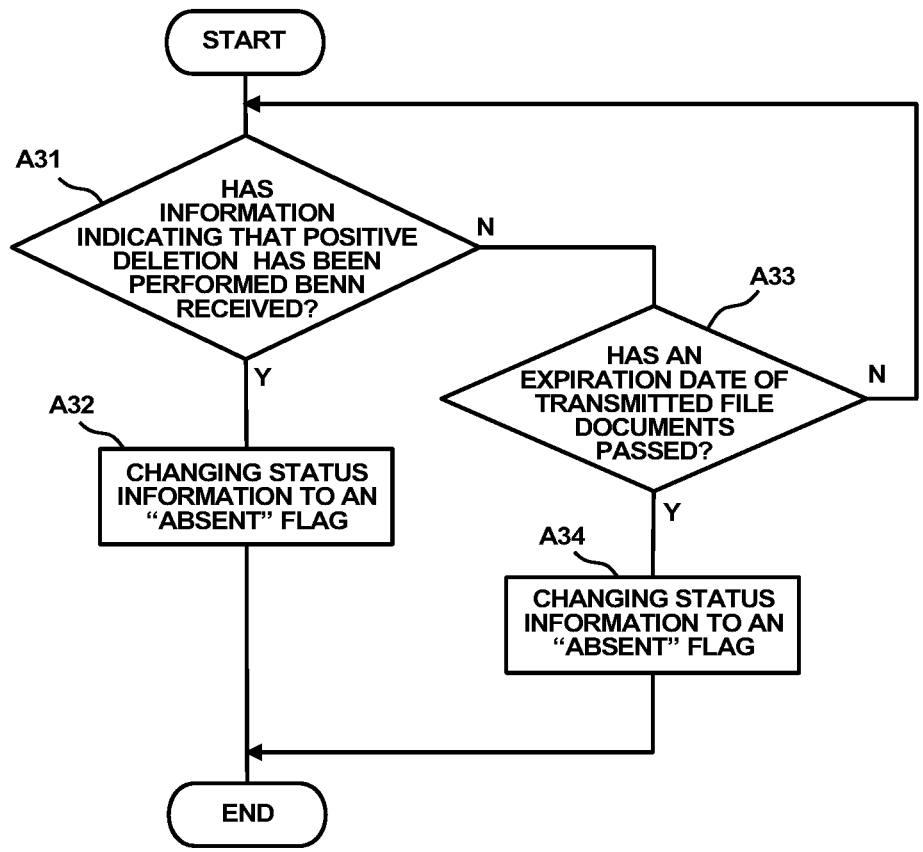
FIG. 8 is a flowchart illustrating second processing of the file document management server according to the embodiment.
Figure 9:
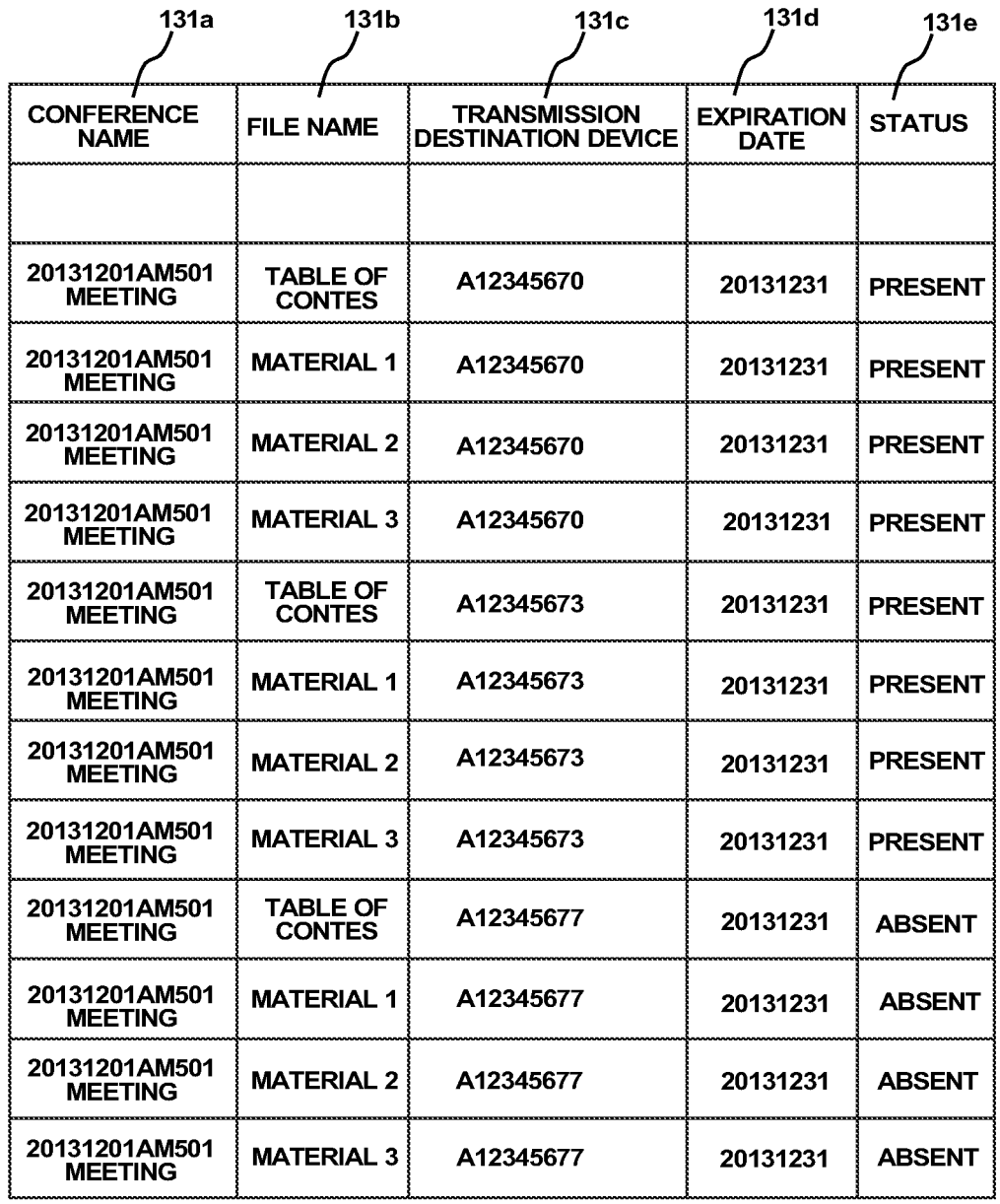
FIG. 9 is a view illustrating transmission management information stored in the memory of the file document management server in a case where a file document which has been transmitted by the file document management server according to the embodiment is positively deleted in a transmission destination client device.

FIG. 8 is a flowchart illustrating the second processing performed by the file document management server 1 to manage the transmitted file documents. The file document management server 1 transmits file documents to the tablet terminal 3, and then performs the processing illustrated in FIG. 8. As illustrated in FIG. 8, in A31, the CPU 11 determines a reception status in the input I/F 14 as to whether or not the information indicating that positive deletion has been performed has been received from the specific tablet terminal 3. When the CPU 11 determines that the input I/F 14 has received the information indicating that the positive deletion has been performed (Y in A31), the processing of the file document management server 1 moves to A32 in FIG. 8. The information indicating that the positive deletion has been performed includes, for example, the transmission destination device information and the file document information (conference name information). In A32, the CPU 11 specifies the file document deleted by the tablet terminal 3 based on the transmission destination device information and the conference name information included in the information indicating that the positive deletion has been performed. The CPU 11 changes for this specified file document the status information (e.g. the status information indicates in the column 131*e* in FIG. 5) stored in the RAM 13 from the "present" flag to the "absent" flag. Changing status information will be more specifically described with reference to FIG. 9. When, for example, the tablet terminal 3 which is specified based on the transmission destination device information "A12345677" positively deletes all materials of a conference (a conference name "20141201AM501 meeting") held on December 1, the CPU 11 receives from the tablet terminal 3 the information indicating that the positive deletion has been performed. The information indicating that the positive deletion has been performed includes information indicating that all file documents of the conference name "20141201AM501 meeting" have been deleted. As illustrated in FIG. 9, the CPU 11 changes status information whose transmission destination device information is "A12345677" (see the column 131*c* in FIG. 9) and whose conference name information is "20141201AM501 meeting" (see the column 131*a* in FIG. 9) to "absent" flag. The CPU 11 has not received information indicating that the positive deletion has been performed, from the tablet terminals 3 other than the tablet terminal 3 which is specified based on the transmission destination device information "A12345677". Hence, as illustrated in FIG. 9, the CPU 11 does not change status information whose transmission destination device information is not "A12345677". The CPU 11 keeps the "present" flag for status information whose transmission destination device information is not "A12345677" by the expiration date (see the column 131*d* in FIG. 9) as long as the CPU 11 does not receive the information indicating that the positive deletion has been performed.

Meanwhile, in A31, when the CPU 11 determines that the input I/F 14 has not received the information indicating that the positive deletion has been performed (N in A31), the processing of the file document management server 1 moves to A33 in FIG. 8. In A33, the CPU 11 determines whether or not the expiration date of transmitted file documents has passed in the transmission management information stored in the RAM 18. In other words, the CPU 11 determines whether or not there is a file document whose expiration date has passed in the transmission management information stored in the RAM 18. When the CPU 11 determines that there is no file document whose expiration date has passed (N in A33), the processing of the file document management server 1 returns to A31 in FIG. 8. When the CPU 11 determines that there is a file document whose expiration date has passed (Y in A33), the processing of the file document management server 1 moves to A34 in FIG. 8. In A34, the CPU 11 changes status information whose file document has an expired expiration date and which is stored in the RAM 13, to the "absent" flag. Changing a status of a file document whose expiration date has passed will be more specifically described with reference to FIG. 10. FIG. 10 illustrates the RAM 13 which stores the transmission management information on, for example, Jan. 10, 2014. Even in a case where the input I/F 14 has not received information indicating that the positive deletion has been performed, as illustrated in FIG. 10, the CPU 11 changes status information of all file documents to "absent" flag since the expiration date of all file documents has passed. Meanwhile, the CPU 31 of the tablet terminal 3 deletes all file documents whose status information has been changed to the "absent" flag in A28. In addition, the CPU 11 may transmit an instruction to delete all file documents, to the tablet terminal 3 in A33, and the CPU 31 of the tablet terminal 3 may delete all file documents according to the instruction to delete all file documents in A28. As described above, the processing in A32 and A34 is processing performed by the CPU 11 to change status information of a transmitted file document to an "absent" flag.

The CPU 11 performs the processing in A32 in FIG. 8 when receiving the information indicating that the positive deletion has been performed. Further, the CPU 11 starts the processing in A33 in FIG. 8 at, for example, 0 o'clock at midnight every day. More specifically, in A33, the CPU 11 changes status information of a file document whose expiration date is a preceding day, from a "present" flag to an "absent" flag upon start of the processing at 0 o'clock at midnight every day.

Figure 11:
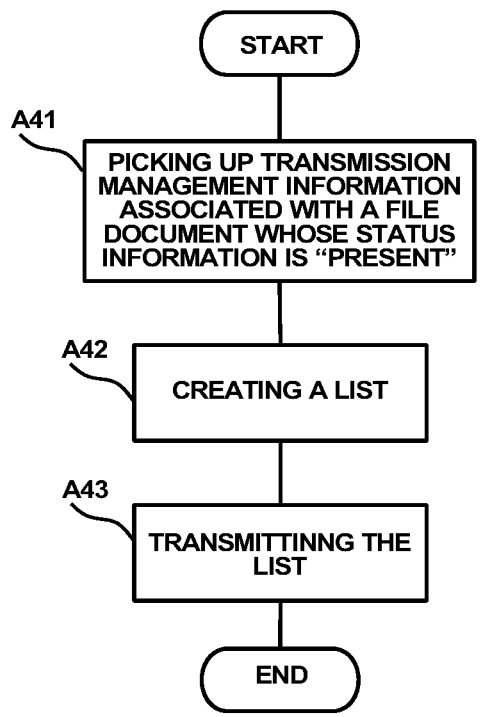
FIG. 11 is a flowchart illustrating third processing of the file document management server according to the embodiment.

Third processing performed by the file document management server 1 to create a status report of file documents transmitted by the file document management server 1 will be described with reference to FIG. 11. FIG. 11 is a flowchart illustrating the third processing performed by the file document management server 1 to create a status report of file documents. The file document management server 1 starts the processing in FIG. 11 when, for example, receiving an instruction to create a status report from an external device. As illustrated in FIG. 11, in A41, the CPU 11 picks up the transmission management information associated with the file document whose "present" flag is stored as status information (e.g. status information indicated in the column 131*e* in FIG. 9) in the RAM 13. The transmission management information associated with the file document whose "present" flag is stored is conference name information, file name information, transmission destination device information (tablet information) and expiration date information which are indicated in the same row of a row in which status information is "present". The CPU 11 picks up the file name information and the transmission destination device information (tablet information) from the transmission management information.

In A41, when the CPU 11 picks up the transmission management information, the processing of the file document management server 1 moves to A42 in FIG. 11. In A42, the CPU 11 creates a list as a status report by associating individually picked-up file names and tablet information. When the CPU 11 creates the status report (list), the processing of the file document management server 1 moves to A43 in FIG. 11. In A43, the CPU 11 transmits the created status report to the external device using the output I/F 15. The external device may be the computer 2 or a printer 5.

As described above, according to the embodiment, the file document management server 1 which has transmitted file documents can manage the transmitted file documents, and learn storage states of the file documents in a transmission destination device (tablet terminal 3).

The above embodiment has been described by using as an example of an electronic conference system which assumes a conference scene. However, the embodiment is not limited to this. The embodiment may be applied to a system which assumes cases such as lecture classes and education. Further, the tablet terminal 3 transmits conference name information as a transmission request of file documents, and the file document management server 1 specifies file documents based on this conference name information and transmits the specified file documents. By contrast with this, the tablet terminal 3 may transmit file name information as a transmission request of file documents instead of the conference name information. Further, an expiration date of file documents transmitted from the file document management server 1 is a common expiration date in conference units. However, the embodiment is not limited to this. Expiration dates may be set to different expiration dates per file document. Further, the expiration date may be set in time units instead of in day units.

In the above embodiment, each device stores in advance a function of carrying out the above processing. By contrast with this, each device according to the embodiment may download the same function from a network or the like or install the same function stored in a recording medium. The recording medium can store a program like a CD-ROM, and may adopt any format as long as the recording medium is a recording medium which can be read by a device. Further, functions which can be installed or downloaded in advance may be realized in collaboration with an OS (Operating System) or the like in each device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A file document management server comprising:
an input interface which receives a transmission request of a file document from a client device;
an output interface which sends the file document to the client device;
a memory which stores the file document, and transmission management information which includes expiration date information indicating an expiration date of the file document which has been transmitted to the client device and status information indicating a storage state or a deletion state of the file document in the client device to which the file document has been transmitted; and
a controller which specifies the file document which is a target of the transmission request, from file documents in the memory when the input interface receives the transmission request, transmits the expiration date information of the specified file document, and the specified file document to the client device using the output interface, and changes the status information of the transmitted file document from the storage state to the deletion state when determining that the expiration date indicated by the expiration date information of the transmitted file document has passed, wherein
when the input interface receives a creation request of a status report indicating the status information, from an external computer which is a creation source of a file document, the controller creates the status report based on the status information stored in the memory, and outputs the created status report.

2. The file document management server according to claim 1, wherein the memory includes a first memory which stores the transmission management information of the file document, and a second memory which stores a plurality of file documents.

3. The file document management server according to claim 2, wherein the second memory stores storage management information including file document information for specifying a stored file document.

4. The file document management server according to claim 3, wherein the transmission management information further includes file document information for specifying a transmitted file document, and transmission destination device information for specifying a client device to which the file document has been transmitted.

5. The file document management server according to claim 4, wherein the transmission request of the file document includes the file document information of the storage management information.

6. The file document management server according to claim 5, wherein, when the input interface receives the transmission request of the file document, the controller specifies the file document which is a target of the transmission request, from a plurality of file documents stored in the second memory based on the file document information included in the transmission request of the file document.

7. The file document management server according to claim 6, wherein, when the controller transmits the specified file document to the client device using the output interface, the controller stores in the first memory the file information, the transmission destination device information, the expiration date information and the status information indicating a storage state of the file document as the transmission management information of the file document to be transmitted.

8. The file document management server according to claim 7, when determining that the expiration date of the transmitted file document has passed, the controller changes the status information which is stored in the first memory and whose file document includes the passed expiration date, from a storage state to a deletion state.

9. The file document management server according to claim 7, wherein, when the input interface receives information indicating that a file document whose expiration date has not passed has been positively deleted, from the client device, the controller specifies the file document deleted by the client device based on the transmission destination device information and the file document information included in the information indicating that the file document has been positively deleted, and changes the status information of the specified file document which is stored in the first memory, from a storage state to a deletion state.

10. The file document management server according to claim 1, wherein the controller stores in the memory the file document received from the external computer using the input interface.

* * * * *